United States Patent [19]

Pribyl

[11] Patent Number: 5,690,398
[45] Date of Patent: Nov. 25, 1997

[54] SNOWMOBILE TRACTION POINT

[75] Inventor: Ralph G. Pribyl, Maple Lake, Minn.

[73] Assignee: Bottom Line Traction Products, Inc., Maple Lake, Minn.

[21] Appl. No.: 688,330

[22] Filed: Jul. 30, 1996

[51] Int. Cl.$^6$ ............................................. B62D 55/28
[52] U.S. Cl. ............................................. 305/162; 305/180
[58] Field of Search ......................... 305/157, 160, 305/161, 162, 165, 167, 180, 191, 192, 35 R, 35 EB

[56] References Cited

U.S. PATENT DOCUMENTS

| | | | |
|---|---|---|---|
| 302,249 | 7/1884 | Hathorn. | |
| 351,915 | 11/1886 | Herrick. | |
| 1,370,758 | 3/1921 | Myers. | |
| 1,803,563 | 5/1931 | Sagen. | |
| 2,310,467 | 6/1943 | Schwab | 152/229 |
| 2,915,101 | 1/1959 | Kratz | 152/222 |
| 3,413,737 | 12/1968 | Kneebusch | 36/67 |
| 3,561,825 | 2/1971 | Gibson et al. | 305/180 X |
| 3,785,420 | 1/1974 | Bradley et al. | 305/180 X |
| 3,838,894 | 10/1974 | Reedy | 305/35 EB |
| 3,973,808 | 8/1976 | Janssen et al. | 305/180 |
| 4,357,763 | 11/1982 | Fleischmann et al. | 36/67 D |
| 4,758,055 | 7/1988 | Anderson | 305/35 EB |
| 4,938,546 | 7/1990 | Simmons | 305/180 |
| 5,188,441 | 2/1993 | Rubel | 305/180 |
| 5,201,574 | 4/1993 | James et al. | 305/180 |
| 5,234,266 | 8/1993 | Musselman et al. | 305/54 |
| 5,273,351 | 12/1993 | Rubel | 305/54 |
| 5,284,386 | 2/1994 | Rubel | 305/54 |
| 5,299,860 | 4/1994 | Anderson | 305/54 |

OTHER PUBLICATIONS

Advertisement in "Hi-Performance Engineering" for Star Stud and Bolt, p. 5 (admitted prior art) Jan. 1995.

*Primary Examiner*—Russell D. Stormer
*Attorney, Agent, or Firm*—Westman, Champlin & Kelly, P.A.

[57] ABSTRACT

A traction point for a snowmobile track includes a fastener that extends through the track with a head on one side of the track, and a pointed nut that has a pointed end and which is threaded onto the fastener on the opposite side of the track from the fastener head. The traction point includes a base for support on the track, and pyramidal shaped reinforcement gussets that merge at a point to provide for increased traction for the snowmobile. Small ribs can be provided on the traction point for engaging the track to reduce the likelihood of the traction point unthreading and coming off during use. The pyramid shaped flanges give a paddle effect as they engage ice or snow to provide increased surface area for reaction of the driving forces from a snowmobile transmitted through the track, and also increased corner traction and braking effect.

19 Claims, 4 Drawing Sheets

SNOWMOBILE TRACTION POINT

BACKGROUND OF THE INVENTION

The present invention relates to a snowmobile traction assisting assembly, which utilizes a threaded shank extending through a snowmobile track and a pointed, combined nut and traction point that threads onto the shank. The traction point protrudes from the track for engagement with support surfaces such as ice, hard packed snow, or powder snow, ground etc.

Many types of snowmobile track studs have been advanced in the past. Generally they are of the type which has a pointed end shank of a bolt like stud that protrudes through the track, with some type of a nut for securing the stud to the track. Various backing plates and similar additional members had been used for increasing the life of the track when the studs are installed and also for supporting the stud when it is in use.

The studs are usually hardened for increased wear, and are positioned along the surface of the track in a predetermined or random pattern for increasing the traction of a snowmobile.

SUMMARY OF THE INVENTION

The present invention relates to a snowmobile track traction increasing point that is threaded on a shank of a bolt having a head on the opposite side of the track. The traction point will penetrate ice, packed snow and powder snow to increase traction of the snowmobile drive belt for better control, braking and acceleration.

The head of the bolt is supported by a washer to increase the surface area for loads from the stud on the track. The traction point has a flange which tightens down onto the track surface. The flange may include ribs on the underside of the flange which will engage the surface of the track and reduce the likelihood of the traction point rotating to loosen during use.

The traction points are threaded much like nuts and are preferably made with a base flange with a hub or housing having a bore with threads in the center portion secured to the flange. The flange is perpendicular to the thread axis and engages the surface of the track. Flat blade gusset members or flutes are supported on the flange and formed into a pyramidal shape to support the flange and threaded housing, and to form an outer end that is pointed. The base ends of the gussets support the flange and hub to reinforce the traction point. The gussets provide for an increase in surface area that will react loads from the track, much like a "paddle", to enhance braking, cornering and straight drive.

The traction points may be hardened, and may be made out of a number of different materials suitable for the application, including various metals such as steel, stainless steel, high strength aluminum, or titanium. The traction points also may be made of any synthetic material which has a high modulus of elasticity, such as reinforced plastics and composites used for applications such as aircraft skin.

The traction points may have carbide pins forming the outer end points inserted in the center of the traction points, and supported by the gusset like supports or flutes. Thermospray carbide can be also applied to the traction points for increased wear resistance. Casting is a preferred method of manufacture.

As shown, the number of support gussets or flutes on each traction point can be varied to suit the desired applications. The different styles of gusset members will not substantially affect the performance of the traction points. It is desirable to have an adequately supported center point for engaging a surface such as ice, and to provide an adequate length for insuring that the stud will penetrate sufficiently to control traction and aid in controlling, braking, cornering, and propelling snowmobiles or other vehicles utilizing a belt-type drive. The flat sides of the gussets or flutes provide a reaction surface area for traction enhancement.

The snowmobile track traction point of the present invention is easy to manufacture, and is convenient for replacement as wear occurs. Further, the traction points are lightweight, strong, easy to install and provide a wide base support for the loads exerted on the traction points when driven by a snowmobile track.

DETAILED DESCRIPTION OF THE PREFERRED EMBODIMENTS

Figure 1:
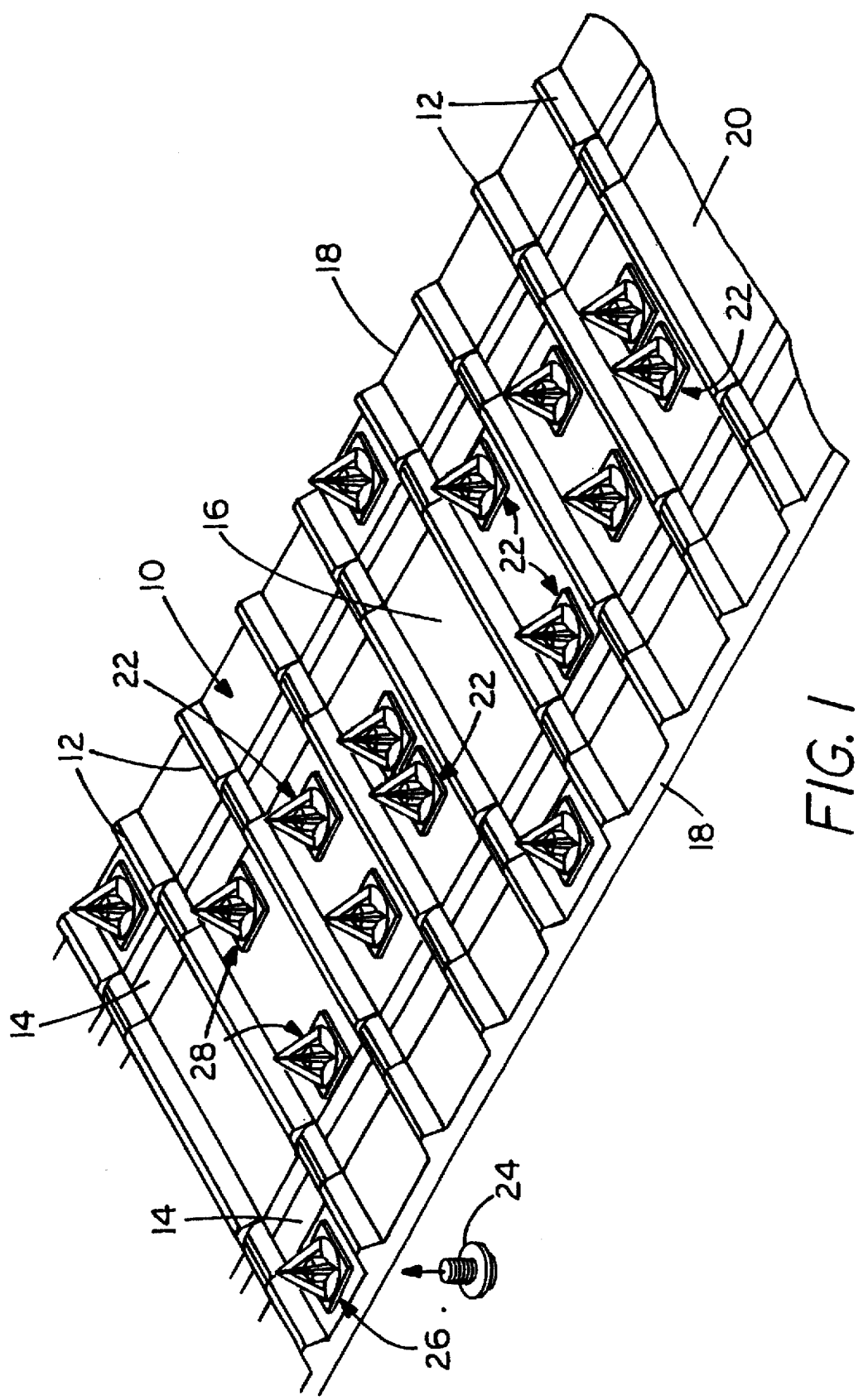
FIG. 1 is a fragmentary schematic perspective view of the typical snowmobile drive track having traction control devices or traction points made according to the present invention installed thereon.

FIG. 1 illustrates a typical snowmobile track 10 in a fragmentary, schematic perspective view. As shown, the track 10 can be made of a suitable synthetic material, such as a synthetic rubber, and includes drive cleats 12 on the drive surface the track (the surface which would face the ground). The track includes sections 14 on which drive sprockets would operate in a normal manner to drive the track.

The track has planar surfaces 16 between the cleats 12 on both outer edge sections 18 of the track and in a center section 20.

As shown, a plurality of traction control and enhancement point assemblies 22 are installed on the track 10 include a bolt like fastener 24 and a traction point 26 that comprises a nut that is threaded on a fastener and supported to protrude from the track surfaces 16 between the cleats 12 of the snowmobile track. The traction points 26 (26 is used as a general number) are of a length so their outer ends protrude beyond the ends of the lugs 12, to provide additional traction on ice, packed snow and the like.

As illustrated in FIG. 1, a plurality of traction point assemblies 22 are arranged in a generally "V" pattern that repeats itself along the length of the track. As shown, two of the traction point assemblies 22 are positioned adjacent each other at a leading end of the "V" and in the next track section, two additional traction point assemblies are spaced farther apart, and in the third section they are spaced still farther apart as illustrated at 28. The last traction points of that "V" are positioned on the outer track sections 18 as shown.

Figure 2:
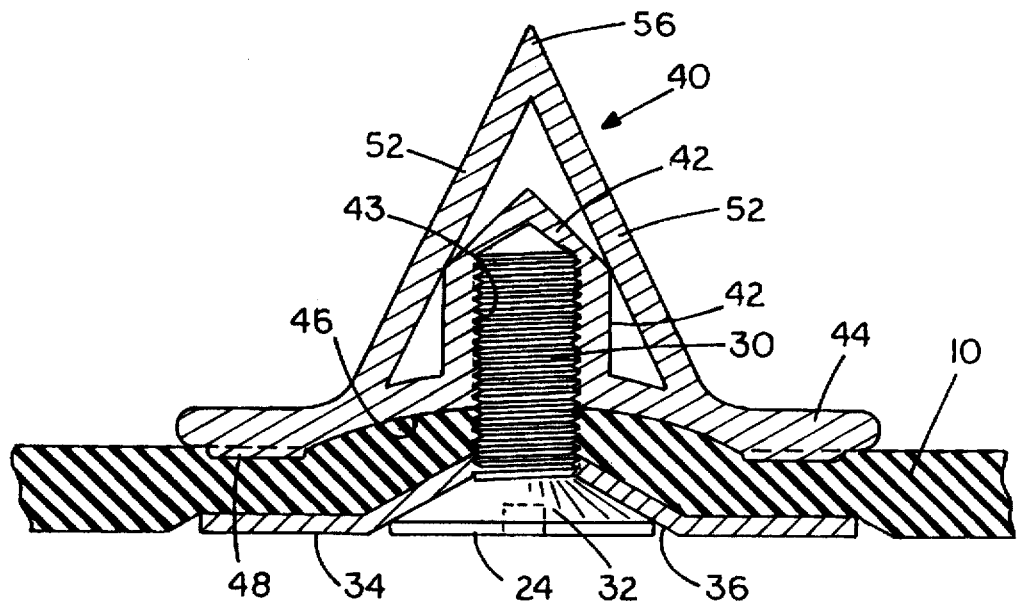
FIG. 2 is a vertical sectional view of a typical snowmobile stud or traction point made according to the present invention shown installed on a snowmobile track.
Figure 3:
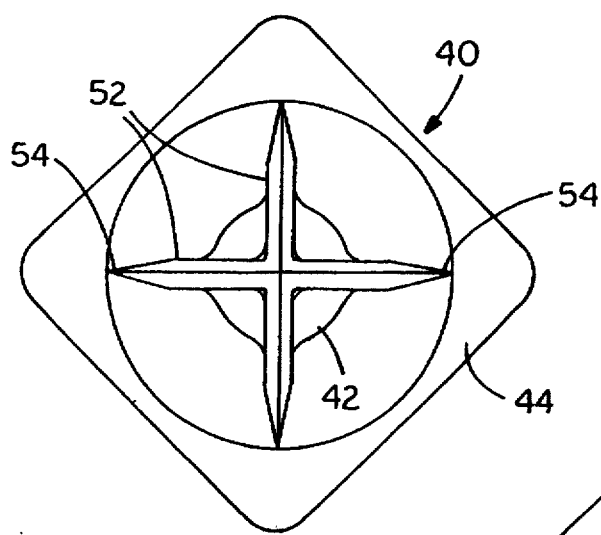
FIG. 3 is a top plan view of a traction point showing a typical arrangement of pyramid like gussets or flutes supporting a central shank and flange.
Figure 5:
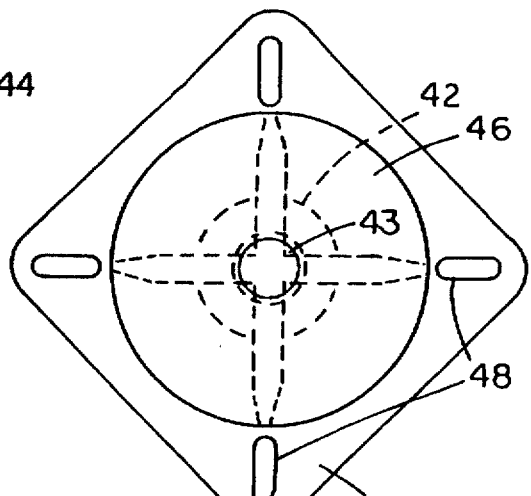
FIG. 5 is a bottom plan view of the device of FIG. 3.
Figure 4:
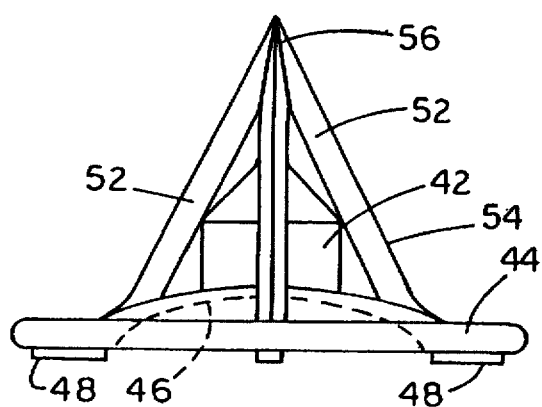
FIG. 4 is a side elevational view of the device of FIG. 3.

Referring to FIG. 2, the snowmobile belt 10 is shown in cross section, and a traction point assembly 22 is illustrated as a typical arrangement for the various traction points that are illustrated in the Figures that follow. In this instance, a fastener 24 which comprises a threaded cylindrical shank 30 having a countersunk head 32 form a support. A reinforcing washer or support flange 34 is formed to have a center recessed portion 36 into which the countersunk head 32 will fit. The traction point illustrated in this form of the invention is indicated at 40, and as shown in FIGS. 3, 4 and 5 as well, the traction point 40 is provided with a central hub or sleeve 42, which has a bore that is threaded on the interior to receive the threaded shank 30. A base or flange 44 extends from this central hub or sleeve 42 a desired distance. The base or flange 44 has a recess 46 on the underside thereof, as shown in FIG. 2, to permit the portion of the track 10 immediately underneath the flange 44 and in the center portions thereof, to be drawn into the recess by the head 32 and the support flange 34 as the traction point 40 is threaded onto the fastener. Additionally, and optionally, the underside of the base or flange 44 can have a plurality of small lock ribs 48 formed thereon (see FIG. 5) at desired locations radially around the bore in the hub or sleeve 42.

In the form shown in FIG. 3, the base 44 has a square outer periphery, but the shape can be varied as desired, to be circular, or some other configuration such as a hexagon, or other polygon.

The central hub or sleeve 42 is supported relative to the base 44 for reacting loads, using a plurality of gusset like flanges or flutes 52, that are supported on the base 44 and extend upwardly to form a pyramidal shape outer edge configuration having outer edges 54. The gussets or flutes 52 meet at the top and are formed into a point 56 for traction enhancement. The traction point 40 can be cast as a unit and thermosprayed with carbide for hardness.

Figure 6:
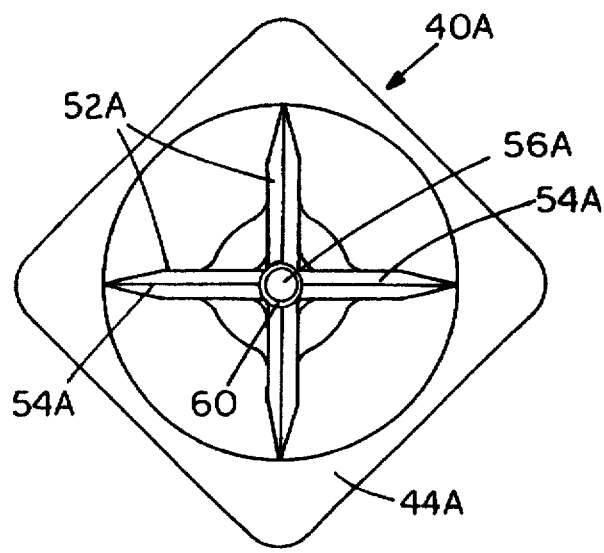
FIG. 6 is a modified form of the invention showing a central pin supported on the traction point.
Figure 7:
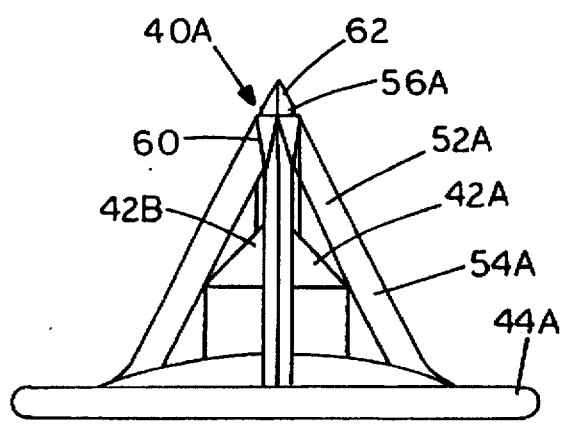
FIG. 7 is a side view of the traction point of FIG. 6.

A modified form of the traction point is shown in FIGS. 6 and 7. The traction point 40A has a base 44A and a central hub or sleeve 42A. Gussets or flutes 52A are fixed to base 44A and extend up to support hub 42A. In this form, a pin 60, preferably of carbide is supported on the hub 42A at 42B. The pin 60 is braced with the individual gussets or flutes 52A at their outer ends. In this form of the invention, the gussets or flutes 52A are welded or otherwise suitably supported to the central pin 60 as indicated at 56, so that a point member 62 of the pin 60 protrudes outwardly from the gussets or flutes 52A to form the ground engaging point. It is to be understood that the gussets or flutes can be formed to be integral with the central hub 42. The gussets or flutes 52A have sharpened edges 54A, as well.

Other modifications that are made involve the arrangement of the traction increasing gussets or flutes around the traction point. They can be arranged such as that shown in FIG. 8, where a traction point 70 has a base 72 with a raised center portion 74 that forms a recess on the bottom side as shown in FIG. 2. In this form a central hub 76 is provided and it has an internal bore threaded for receiving the threaded shank of a fastener. The flange 72 is also shown as being square in plan view, and has rounded edges 78, which tend to reduce the likelihood of the flanges cutting the track if the traction point tilts under load. All of the flanges for the traction points have rounded edges to protect the track. In this form of the invention, the central hub 76 is supported with three gussets or flutes 80 that form a pyramid shape, as shown in FIG. 9, and the gussets form a sharpened point 82 where they meet in the center or apex of the unit. In this form of the invention, the traction point also is preferably cast and then coated with a hard coating. As shown, the flanges 80 also have sharpened edges 81 for increasing the "bite". Ribs 83 for resisting rotation when the traction point is tightened are provided on the undersurface of the base.

Figure 8:
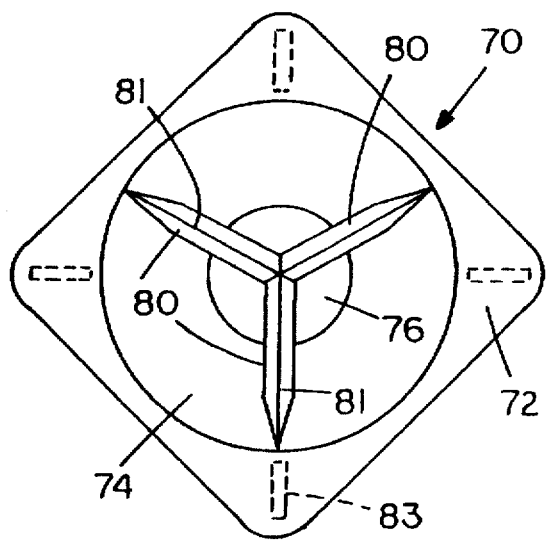
FIG. 8 is a top plan view of a modified form of the device of the present invention showing three gussets or flutes formed into a pyramid shape.
Figure 9:
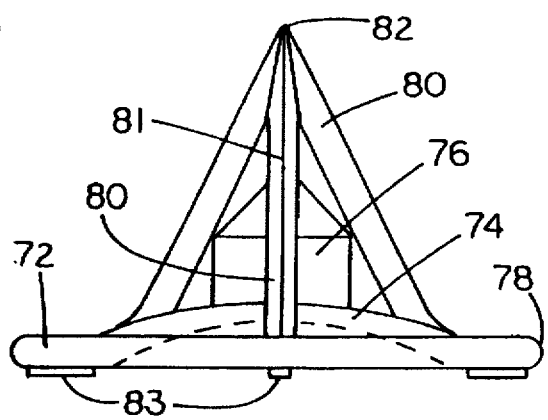
FIG. 9 is a side elevational view of the device of FIG. 8.
Figure 10:
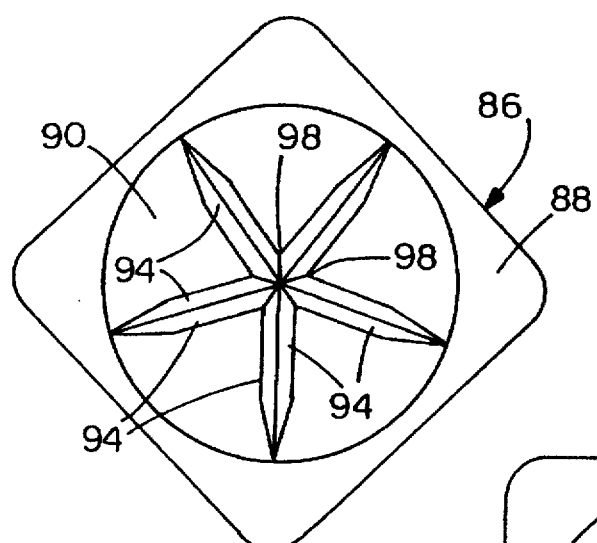
FIG. 10 is a top plan view of a further modified form of the traction point showing the use of five gussets or flutes.
Figure 11:
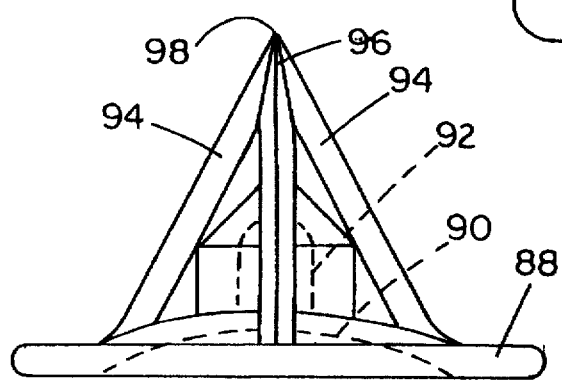
FIG. 11 is a side elevational view of the traction point of claim 10.

FIGS. 8 and 11 show a further modified form of the invention comprising a traction point 86 that has a base 88, again with a center portion 90 that forms a recess to permit the track to move into the recess when the fastener is put into place as shown in FIG. 2. The base flange 88 supports a center hub 92 that has a bore that is threaded on the interior for receiving the fastener as shown in FIG. 2. The center hub 92 is supported with five blade like gussets or flutes 94 that are attached to the base 88 adjacent the outer edges of the center portion 90, and which are joined together at an apex 96 so that they form a pyramidal shape. The traction point 86 may be cast. The flutes are sharpened into a point 98 for increasing the traction of a snowmobile belt when they are attached to the track.

Figure 12:
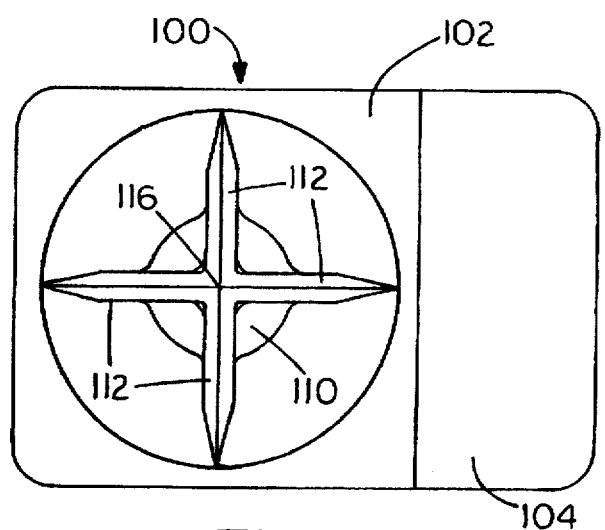
FIG. 12 is a top plan view of a further modified form of the present invention showing a support flange that has a raised tab for clearance and support on a rib of a track.
Figure 13:
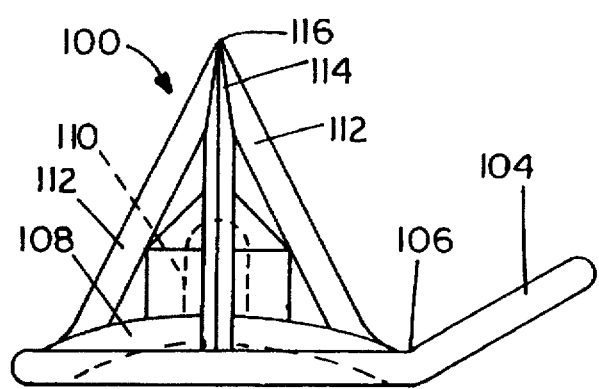
FIG. 13 is a side elevational view of the traction point of FIG. 12.

FIGS. 12 and 13 show a modified form of the invention wherein a traction point 100 is shown with a base 102 that includes a tab 104 along one edge. The base 102 is generally square, up to a bend line 106 for the tab 104. In this form of the invention, the base 102 has a raised center portion 108 that forms a recess on the underside as explained, together with a sleeve or hub 110 that has a central bore threaded for receiving a fastener.

In this form of the invention, a plurality of gussets or flutes 112 are provided and they are secured to the base 102. The gussets or flutes joined together adjacent the outer ends 114 to form a point 116. The tab 104 can be used adjacent a cleat on the track for clearance and support. The tab 104 would be oriented in the appropriate direction.

The gussets or flutes in all forms of the invention provide a paddle effect with the side surfaces to increase the traction enhancing effect over a conventional cylindrical snowmobile stud.

While the head of the fastener is not shown in detail, it can be a socket head fastener, which will receive an Allen wrench, or a TORX wrench to permit rotating the fastener to tighten it onto the threaded portion or bore of the center hub of the traction point. The head is tightened into position so that it is recessed from the plane of the track member 10 when fully tightened.

The traction points are easily tightened in place. They can be held easily while the fastener is turned for tightening the ribs on the bottom side of the base of the traction points hold the traction point from turning during final tightening and resist reverse rotation to prevent loosening.

It should be noted that the traction point can be fabricated by punching out a metal part and folding up side members from the base to form a pyramid shape traction point.

Although the present invention has been described with reference to preferred embodiments, workers skilled in the art will recognize that changes may be made in form and detail without departing from the spirit and scope of the invention.

What is claimed is:

1. An apparatus for increasing the traction capability of a track driven vehicle comprising:

a traction point having a base, a central hub extending from the base and a portion forming an outer end point;

a fastener comprising a threaded shank and a head having a countersunk tapered portion between an outer surface of the head and the threaded shank;

the central hub having a threaded bore for receiving the threaded shank of the fastener for tightening and clamping a resilient member between the head and the base, said base having a recess for permitting the member to be clamped to deflect into said recess when the traction point is tightened onto said threaded shank.

2. The apparatus of claim 1, wherein said base has a plurality of ribs formed on a surface thereof opposite the central hub for engaging a resilient member to be clamped.

3. The apparatus of claim 1, wherein said portion forming an outer end point comprises a plurality of substantially planar gussets extending radially from a center of the central hub outwardly, and being tapered to converge in a direction away from said base.

4. The apparatus of claim 1, including a cylindrical pointed pin member extending outwardly from said central hub and supported by said radial flanges.

5. The apparatus of claim 1, including a stabilizing washer for receiving the countersunk tapered portion of said head and for bearing against an opposite side of a member to be clamped from the base.

6. The apparatus of claim 1, wherein said portion forming an outer end point is hardened.

7. The apparatus of claim 1, wherein the base has edges, and said edges being rounded to a smooth contour to avoid damaging a member on which it is clamped.

8. The apparatus of claim 1, wherein said base has a protruding flange along one edge thereof, which is inclined away from a plane of the base in the same direction as the direction of the extension of the central hub.

9. A traction point for a snowmobile track comprising a base defining a support face, a hub supported on the base and having a threaded bore opening through the base for receiving a fastener, and at least three traction drive members fixed to the base at spaced positions on the same side thereof as the hub, and tapering outwardly away from the base in the direction of the hub toward a center axis of the hub, the traction drive members being adjacent and forming a point at outer ends thereof.

10. The traction point of claim 9, wherein the traction drive members are gusset members and comprise flat blades oriented so flat sides thereof are parallel to radial planes passing through the center axis of the hub.

11. The traction point as claimed in claim 10 and a pin supported on said hub and extending outwardly to form an exposed point, the gusset members supporting the pin.

12. The traction point of claim 10, wherein the base is substantially square, and said flat blades extend from edges of said square base to the outer ends adjacent the central axis of the hub.

13. The traction point of claim 10, wherein the gusset members are metal and are coated with a hard surface material.

14. The traction point of claim 9, wherein the base has a plurality of generally radial ribs on a side of the base opposite the hub.

15. The traction point of claim 9, wherein the traction drive members taper from adjacent side edges of the base to substantially the center axis of the hub.

16. The traction point of claim 15, wherein the outer ends of the traction drive members are secured together to form a point.

17. The traction point of claim 9, wherein said base is substantially square, and wherein the traction drive members taper from each of the edges of the square base to the outer end.

18. The traction point of claim 10, wherein said flat blades are secured to at least portions of said hub.

19. A traction point for a snowmobile track comprising a base, a hub supported on the base and having a threaded bore opening through the base for receiving a fastener, and a plurality of at least four flat blade gusset members fixed to the base and tapering outwardly from the base on a side of the base the same as the hub toward a central axis of the hub, the flat blades being oriented so flat sides thereof are parallel to radial planes passing through the central axis of the hub, the flat blades being secured together at outer ends.

* * * * *